(12) United States Patent
Mertes et al.

(10) Patent No.: US 7,565,528 B1
(45) Date of Patent: Jul. 21, 2009

(54) METHOD FOR GENERATING ASYMMETRICAL CRYPTOGRAPHIC KEYS BY THE USER

(75) Inventors: Paul Mertes, Freudenberg (DE); Werner Mettken, Hallenberg (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/381,056

(22) PCT Filed: Dec. 9, 1998

(86) PCT No.: PCT/EP98/07984

§ 371 (c)(1), (2), (4) Date: Dec. 21, 1999

(87) PCT Pub. No.: WO99/35781

PCT Pub. Date: Jul. 15, 1999

(30) Foreign Application Priority Data

Jan. 12, 1998 (DE) .................................. 198 01 241

(51) Int. Cl.
*H04L 9/00* (2006.01)
*H04L 9/08* (2006.01)
*H04L 9/32* (2006.01)

(52) U.S. Cl. ................ 713/156; 713/158; 380/277; 380/278

(58) Field of Classification Search ............ 380/277, 380/278, 30, 280; 713/156, 157, 158
See application file for complete search history.

(56) References Cited

U.S. PATENT DOCUMENTS

| | | | | |
|---|---|---|---|---|
| 4,868,877 A | * | 9/1989 | Fischer | 713/157 |
| 5,164,988 A | * | 11/1992 | Matyas et al. | 713/156 |
| 5,513,245 A | | 4/1996 | Mizikovsky et al. | |
| 5,606,617 A | | 2/1997 | Brands | |
| 5,825,300 A | * | 10/1998 | Bathrick et al. | 380/30 |

FOREIGN PATENT DOCUMENTS

| | | |
|---|---|---|
| WO | WO 95 14283 | 5/1995 |
| WO | WO 2007091002 A1 * | 8/2007 |

OTHER PUBLICATIONS

Paul van Oorschot, "Extending cryptographic logics of belief to key agreement protocols", Dec. 1993, Proceedings of the 1st ACM conference on Computer and communications security CCS '93, pp. 232-243.*
Alfred J. Menezes et al., Handbook of Applied Cryptography, 197, pp. 544-545.
Kowalski, "Security Management System," The Telecommunications Engineer Apr. 5, 1995, pp. 1-63.

* cited by examiner

*Primary Examiner*—Matthew Smithers
*Assistant Examiner*—Courtney D. Fields
(74) *Attorney, Agent, or Firm*—Kenyon & Kenyon LLP

(57) ABSTRACT

A method in which a user first receives from a Trust Center a generated, personalized, and certified key pair as well as components for producing encryption pairs. The user at any time himself produces an encryption key pair, marks the public part of this pair using the secret signature key relinquished to him, and transmits the result to the Trust Center, where the result is assigned to the user using the certified public part of the signature key pair.

6 Claims, 1 Drawing Sheet

METHOD FOR GENERATING ASYMMETRICAL CRYPTOGRAPHIC KEYS BY THE USER

BACKGROUND INFORMATION

The present invention relates to an asymmetrical cryptological method. A symmetrical cryptological methods are described generally in Menezes: Handbook of Applied Cryptography, 1997. The present invention relates in particular to all forms of asymmetrical cryptological methods. Such methods are used, for example, in ATM cards/bank transactions, access controls to networks/databases, entry controls to buildings/rooms, digital signatures, digital IDs/patient cards, etc.

A crucial problem of all known open cryptological methods is the reliable assignment to the authorized user of the utilized signature and encryption keys and the confirmation of the assignment by an independent third entity. In technical terms, this is a question of the reliable personalization of the keys along with subsequent certification.

Trustworthy methods, such as are described by Kowalski, in The Telecommunications Engineer 4/5 1995: "Security Management System," solve this problem currently by generating, personalizing, and certifying keys of this type at a central, particularly secure location (usually so-called Trust Centers).

However, it cannot be excluded that in the future the users themselves will increasingly wish to generate their cryptokeys, in particular those for encryption. This desire should not be realized at the expense of the security and reliability of the method in question, as is the case today in the only loosely organized asymmetrical cryptological methods of the Internet. In generating asymmetrical cryptokeys in the handwriting of the user, signature and encryption keys are necessary, and in personalizing and certifying, reliable connections to a Trust Center are necessary. If users wish to generate their own keys, particularly cryptokeys, security problems arise.

SUMMARY OF THE INVENTION

Thus as the objective of the invention, a method is required which shifts the generation of keys into the area of responsibility of the user without forfeiting the organizational security of an independent entity.

DETAILED DESCRIPTION

Figure 1:
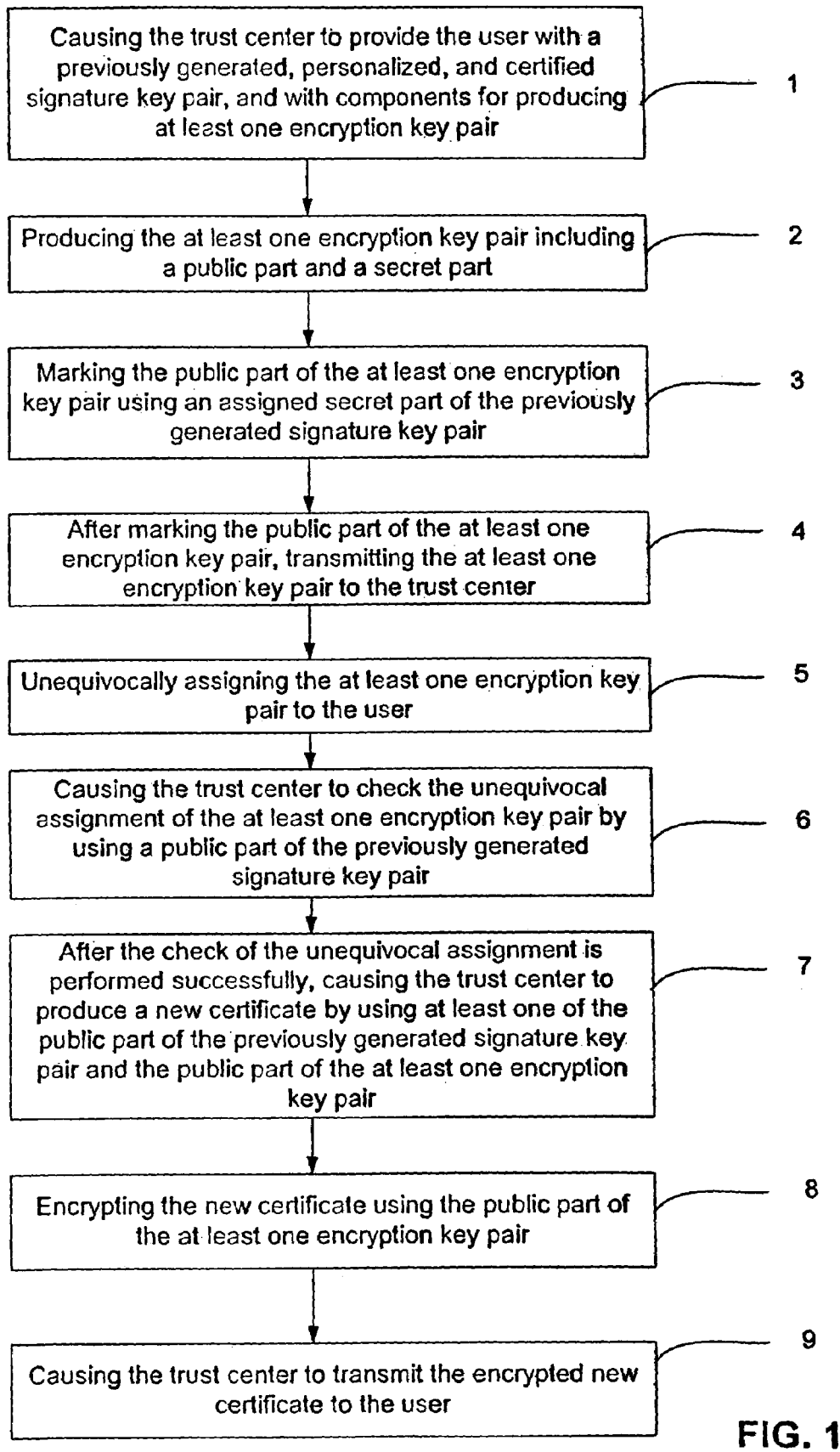
FIG. 1 shows a flowchart for generating, personalizing, and certifying an asymmetrical cryptokey.

The user receives from the central location, hereinafter termed Trust Center, a signature key pair that is already generated, personalized, and certified, e.g., a private signature key PS and a public signature key ÖS as well as the components for producing one or more encryption key pairs, Generate Encryption Keys, GEK.

The user then himself produces at any time an encryption key pair, e.g., a private encryption key PVS, marks the public part of this pair, public encryption key OVS, using the previously relinquished secret signature key PS, and transmits the result to the Trust Center. There, using a check with the aid of the certified public part of the signature key pair ÖS of the user, the result is to be assigned as belonging, unequivocally and reliably, to the user.

The Trust Center thereupon generates a new certificate, in which are contained either both the public part of signature key pair ÖS as well as that of encryption key pair ÖVS, or only that of the encryption key pair ÖVS of the user.

This certificate, in the next step, is then encrypted using the public part of the encryption key pair ÖVS of the user and is then transmitted.

Thus it is assured that only the authorized user is able to decode the certificate and, in hardware-based systems, can download it into his corresponding hardware. At no time does the user have to reveal his secret, namely the secret part of encryption key pair PVS.

If the user also wishes to generate the signature key pair in his area of responsibility, in other words if he also wants to protect the secret part of a signature key pair, a second private signature key PS2, from being accessed by the Trust Center, then this method is also used analogously for this purpose. Only the components Generate Digital Signature Keys, GDSK, for producing one or more signature key pairs, are also relinquished to the user.

Once generated, with the aid of the secret signature key PS relinquished by the Trust Center, the user also marks the public part of self-generated signature key pair ÖS2, in addition to or simultaneous with the public part of self-generated encryption pair ÖVS, and the result is transmitted to the Trust Center, where subsequently the process is continued just as described above.

If user AW1 does not wish to have any further communication with a Trust Center, he can do this as well using the described method without any loss of reliability, by first marking and making available to the communication partner the public part of his self-generated key pair ÖVS using the secret part of the previously relinquished, personalized, and certified key pair PS in every bilateral communication with another user AW2.

Receiving communication partner AW2 can reliably check the correct assignment of this information with regard to public part ÖVS of the key pair self-generated by sending user AW1 by verifying the signature and, if necessary, checking the genuineness and validity of the certificate in the Trust Center underlying this signature.

Another exemplary embodiment of the present invention involves a method for generating, personalizing, and certifying an asymmetrical cryptokey in accordance with one of an operation performed at a central, secure location corresponding to a trust center and an operation performed at a user location in cooperation with the trust center using a secure transmission between a user and the trust center. This method, shown in FIG. 1, includes causing 1 the trust center to provide the user with a previously generated, personalized, and certified signature key pair, and with components for producing at least one encryption key pair. Further, at least one encryption key pair is produced 2, the encryption key pair including a public part and a secret part. The public part of the encryption key pair is marked 3 using an assigned secret part of the previously generated signature key pair. After the public part is marked, then the encryption key pair is transmitted 4 to the trust center. The encryption key pair is unequivocally assigned 5 to the user. The trust center is caused 6 to check the unequivocal assignment of the encryption key pair by using a public part of the previously generated signature key pair. After the check of the unequivocal assignment is performed successfully, the trust center is caused 7 to produce a new certificate by using at least one of the public part of the previously generated signature key pair and the public part of the at least one encryption key pair. The new certificate is encrypted 8 using the public part of the at least one encryption key pair. The trust center is caused 9 to transmit the encrypted new certificate to the user.

What is claimed is:

1. A method for generating, personalizing, and certifying an asymmetrical cryptokey in accordance with one of an operation performed at a central, secure location corresponding to a trust center and an operation performed at a user location in cooperation with the trust center using a secure transmission between a user and the trust center, the method comprising the steps of:

causing the trust center to provide the user with a previously generated, personalized, and certified signature key pair, and with components for producing at least one encryption key pair;

producing by the user the at least one encryption key pair including a public part and a secret part;

marking the public part of the at least one encryption key pair using an assigned secret part of the previously generated signature key pair;

after marking the public part of the at least one encryption key pair, transmitting the at least one encryption key pair to the trust center;

unequivocally assigning the at least one encryption key pair to the user;

causing the trust center to check the unequivocal assignment of the at least one encryption key pair by using a public part of the previously generated signature key pair;

after the check of the unequivocal assignment is performed successfully, causing the trust center to produce a new certificate by using at least one of the public part of the previously generated signature key pair and the public part of the at least one encryption key pair;

encrypting the new certificate using the public part of the at least one encryption key pair; and causing the trust center to transmit the encrypted new certificate to the user.

2. The method according to claim 1, wherein:

the step of causing the trust center to provide the user with components for producing at least one encryption key pair includes the step of providing the user with components for producing at least one additional signature key pair, the step of producing the at least one encryption key pair includes the step of producing the at least one additional signature key pair, and the user marks a public part of the at least one additional signature key pair using the secret part of the previously generated signature key pair.

3. The method according to claim 2, further comprising the steps of:

in each bilateral communication occurring between a user desiring no communication with the trust center and another user, marking and making available to the other user one of the public part of the at least one encryption key pair and the public part of the at least one additional signature key pair by using the secret part of the previously generated signature key pair; and checking a correctness of an assignment regarding one of the public part of the at least one encryption key pair and the public part of the at least one additional signature key pair by performing the steps of:
verifying a signature, and
checking a genuineness and a validity of the new certificate in the trust center.

4. A method for generating, personalizing, and certifying an asymmetrical cryptokey in accordance with one of an operation performed at a central, secure location corresponding to a trust center and an operation performed at a user location in cooperation with the trust center using a secure transmission between a user and the trust center, the method comprising the steps of:

causing the trust center to provide the user with a previously generated, personalized, and certified signature key pair, and with components for producing at least one encryption key pair;

producing by the user the at least one encryption key pair including a public part and a secret part;

marking the public part of the at least one encryption key pair using an assigned secret part of the previously generated signature key pair;

after marking the public part of the at least one encryption key pair, transmitting the at least one encryption key pair to the trust center;

unequivocally assigning the at least one encryption key pair to the user;

causing the trust center to check the unequivocal assignment of the at least one encryption key pair by using a public part of the previously generated signature key pair;

after the check of the unequivocal assignment is performed successfully, causing the trust center to generate a new certificate by using one of: i) the public part of the previously generated signature key pair and the public part of the at least one encryption key pair, and ii) the public part of the at least one encryption key pair;

encrypting the new certificate using the public part of the at least one encryption key pair;

causing the trust center to transmit the encrypted new certificate to the user;

in each bilateral communication occurring between a user desiring no communication with the trust center and another user, marking and making available to the other user the public part of the at least one encryption key pair by using the secret part of the previously generated signature key pair; and checking a correctness of an assignment regarding the public part of the at least one encryption key pair by performing the steps of:
verifying a signature, and
checking a genuineness and a validity of the new certificate in the trust center.

5. The method of claim 1 wherein the secret part of the encryption key pair is not revealed by the user.

6. The method of claim 4 wherein the secret part of the encryption key pair is not revealed by the user.

* * * * *